United States Patent
Ogino et al.

(10) Patent No.: US 7,355,995 B2
(45) Date of Patent: Apr. 8, 2008

(54) MOBILE COMMUNICATIONS TERMINAL WITH POSITION DETERMINATION

(75) Inventors: Hiroyasu Ogino, Okazaki (JP); Michio Shamoto, Niwa-gun (JP); Toshihiro Takeuchi, Tokoname (JP); Atsushi Hayashida, Kariya (JP); Kyoji Oda, Gamagori (JP); Tatsuya Shintai, Chita-gun (JP)

(73) Assignee: Denso Corporation, Kariya (JP)

( * ) Notice: Subject to any disclaimer, the term of this patent is extended or adjusted under 35 U.S.C. 154(b) by 1129 days.

(21) Appl. No.: 10/193,898

(22) Filed: Jul. 15, 2002

(65) Prior Publication Data

US 2003/0026225 A1 Feb. 6, 2003

(30) Foreign Application Priority Data

Jul. 31, 2001 (JP) ............................. 2001-232318

(51) Int. Cl.
*H04Q 7/00* (2006.01)
*H04Q 7/20* (2006.01)

(52) U.S. Cl. ................................... 370/328; 455/456.1
(58) Field of Classification Search ...................... None
See application file for complete search history.

(56) References Cited

U.S. PATENT DOCUMENTS 6,134,448 A * 10/2000 Shoji et al. ............... 455/456.2
6,208,871 B1 * 3/2001 Hall et al. ................... 455/517
6,456,606 B1 * 9/2002 Terasawa .................... 370/331
7,039,418 B2 * 5/2006 Amerga et al. .......... 455/456.1
2002/0004398 A1 * 1/2002 Ogino et al. ................ 455/456
2002/0086680 A1 * 7/2002 Hunzinger .................. 455/456

FOREIGN PATENT DOCUMENTS

| JP | A 11-239381 | 8/1999 |
| JP | A 11-326484 | 11/1999 |
| JP | A2000-50348 | 2/2000 |
| JP | A 2000-312371 | 11/2000 |
| JP | A 2001-61178 | 3/2001 |
| JP | A 2001-197548 | 7/2001 |
| KR | 1999-0087316 | 12/1999 |
| KR | 2000-0007805 | 2/2000 |
| WO | WO 97/33386 | 9/1997 |

* cited by examiner

*Primary Examiner*—Daniel J. Ryman
*Assistant Examiner*—Clemence Han
(74) *Attorney, Agent, or Firm*—Oliff & Berridge, PLC

(57) ABSTRACT

A mobile communications terminal has a transmitter for transmitting a specific identification code of a reference base station as a time reference for network position determination. Therefore, a position server connected with a CDMA network can distinguish the reference base station from the other base stations regardless of positioning relationship between the mobile terminal and the base stations.

1 Claim, 6 Drawing Sheets

| BS PN OFFSETS | ID CODE | FREQUENCY | ... |
|---|---|---|---|
| ••• | •••• | •••• | ... |
| ••• | •••• | •••• | |
| ••• | •••• | •••• | |
| ••• | •••• | •••• | |
| ••• | •••• | •••• | |
| ⋮ | ⋮ | ⋮ | ... |

MOBILE COMMUNICATIONS TERMINAL WITH POSITION DETERMINATION

CROSS REFERENCE TO RELATED APPLICATION

This application is based upon and claims the benefit of Japanese Patent Application No. 2001-232318 filed on Jul. 31, 2001, the contents of which are incorporated herein by reference.

FIELD OF THE INVENTION

The present invention relates to a mobile communications terminal (mobile terminal) with position determination based on communicating with a base station via radio signals.

BACKGROUND OF THE INVENTION

Conventionally, in a communications network such as a cell phone network, a position of a mobile terminal is determined by a delay time of a signal from a base station. For example, the mobile terminal calculates the delay time of the radio signal from the base station and transmits resultant information to a position server. The position server calculates the position of the mobile terminal. The mobile terminal then obtains its position information from the calculated result via the communications network and determines a position thereof.

To determine the position of the mobile terminal, it is necessary to memorize almanac information of the base station and execute complex calculations based on the almanac information. Therefore, normally, the mobile terminal does not execute the complex calculation. That is, the mobile terminal obtains information for the complex calculation and makes the position server execute the complex calculation based on the information therefrom.

The position of the mobile terminal is calculated as follows. FIG. 8 is a schematic view showing communications with a CDMA (Code Division Multiple Access) transmission system. Respective base stations A-E are determined by PN (Pseudo Noise) offset assigned to each base station. The mobile terminal MS selects not only a communication target base station A communicating therewith but also a reference base station. For example, because the reference base station is used as a time reference for calculating the position of the mobile terminal MS, base station C is selected, as it has the shortest radio signal delay time among all base stations.

The mobile terminal MS transmits position information, which includes the PN offsets indicating position information of the base stations A-E (e.g., PN 65 is the PN offset of the base station A, PN 384 is that of the base station B and PN 256 is that of the base station C in FIG. 8) and calculated delay times of respective base stations A-E relative to the position server.

The position server extracts the latitudes and longitudes of respective base stations A-E based on the position information (i.e., respective PN offsets) from the mobile terminal MS with base station almanac information prepared beforehand. The position server calculates distances between each base station and the mobile terminal MS based on relative values thereof defined by the signal delay time to the time reference when the signal delay time of the base station C is the time reference. The resultant distances are retransmitted to the mobile terminal MS.

A region shown within a circle in the figure (hereinafter referred as serving region) is defined as a predetermined radius from a serving base station for determining the reference base station by the position server. If the position server confirms the base station that is selected as the reference base station by the mobile terminal MS within the serving region, the position server determines that the base station is the reference base station and the time reference for a position calculation. The radius of the serving region is defined with respect to each base station and memorized in the base station almanac information stored in the position server. Incidentally, the arrows shown in the figure indicate the relationships by which the mobile terminal MS obtains base station information from the other base stations.

Since the PN offsets are defined by finite numbers (i.e., 128 to 512 species), plural base stations having identical PN offsets are sometimes assigned in the same serving region. In this case, it is impossible to determine the correct reference base station from the plural base stations with the same PN offset. Therefore, the position calculation is erroneous because the signal delay times of the plural base stations are different from each other.

When the mobile terminal MS is moved from the position shown in FIG. 8 to the position shown in FIG. 9, the mobile terminals MS select the nearest base station therefrom as the reference base station. Accordingly, the base station E having PN offset 128 is selected as the reference base station. However, base station D has a PN offset 128 in the serving region. Therefore, the position server must select not the base station A selected by the mobile terminal MS but the base station D. In this case, as mentioned above, a position calculation error is caused because the signal delay times of the plural base stations are different from each other.

SUMMARY OF THE INVENTION

It is therefore an object of the present invention to provide a mobile terminal that is capable of obviating the above problem.

It is another object of the present invention to provide a mobile terminal that is capable of accurately determining its position thereof regardless of the positioning relationship between the mobile terminal and base stations.

According to a mobile communications terminal of this invention, a transmitter in the mobile communications terminal transmits a specific identification code of a reference base station to be a position determination time reference to the network. Therefore, the network can distinguish the reference base station from the other base stations regardless of the positioning relationship between the mobile terminal and base stations.

According to this invention, the respective base stations have PN offsets. The position determination is executed based on the identification code of the reference base station and the PN offsets of the respective base stations except the reference base station. Therefore, the mobile communications terminal acquires base station information rapidly because respective base stations can be determined based on the PN offsets that are acquired during communication of the mobile communications terminal.

According to this invention, communication of the mobile communications terminal is disconnected to place the mobile communications terminal into an idle mode if the mobile communications terminal is in a connection mode. Then, the identification code is acquired from overhead information received during the idle mode.

Accordingly, the mobile communications terminal can receive the identification code from the overhead information when in the idle mode.

According to this invention, an identification codes list includes a correspondence list between the PN offsets and identification codes of the respective base stations. The identification code of the reference base station is determined by searching for an identification code corresponding to the PN offset of the reference base station from the identification codes list.

Therefore, the mobile communications terminal can acquire the identification code of the reference base station without interrupting its connection mode.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

Figure 1:
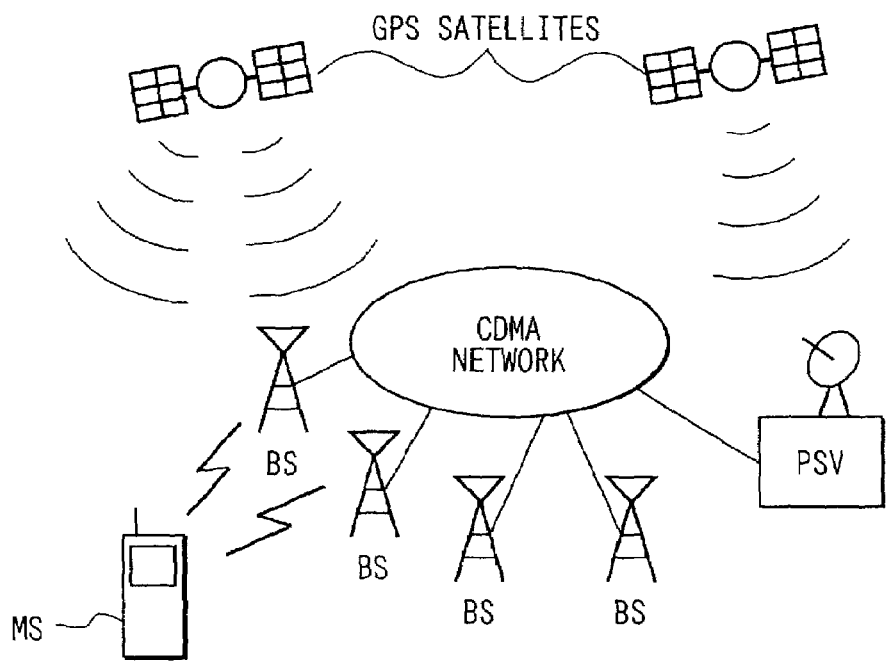
FIG. 1 is a schematic view showing a communications system with a CDMA network according to a first embodiment of the present invention.

The present invention will be described further with reference to various embodiments shown in the drawings.

First Embodiment

Referring to FIG. 1, a mobile terminal MS communicates with respective base stations BS that are connected to a CDMA network. A position server PSV is connected to the CDMA network. The position server PSV executes a position calculation based on position information from the mobile terminal MS. The respective base stations BS and the position server PSV receive signals from GPS satellites (hereinafter GPS signals) and synchronize system clocks thereof with the GPS signals. The mobile terminal MS is able to receive the GPS signals when needed and transmits the received GPS signals to the position server PSV via the network as position information for calculating a position thereof.

Figure 2:
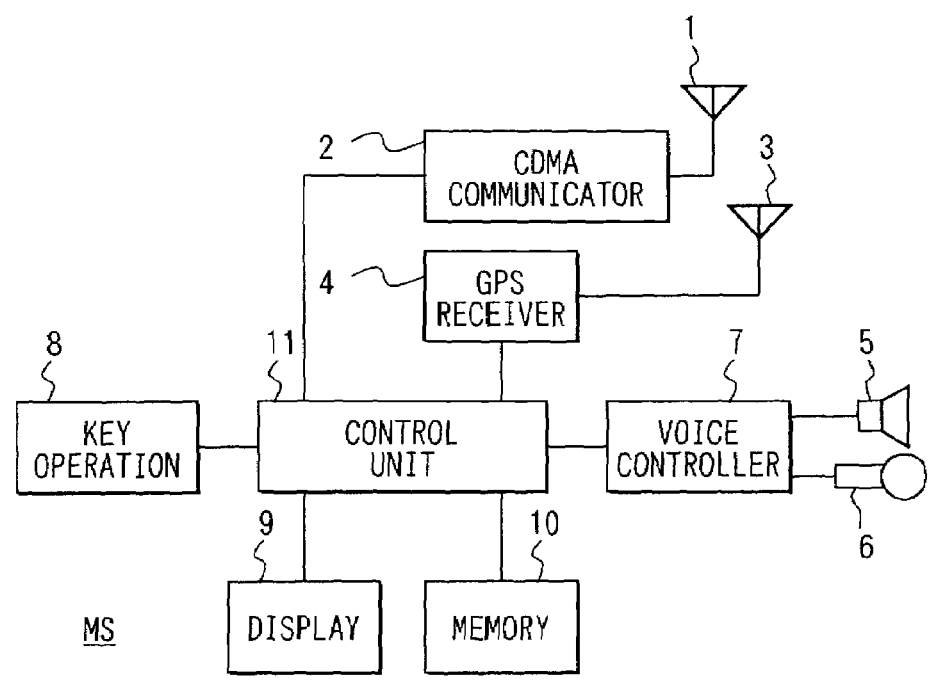
FIG. 2 is a block diagram showing elements of a mobile terminal according to the first embodiment.

As shown in FIG. 2, the mobile terminal MS includes a CDMA antenna 1, a CDMA radio communicator (a receiver and a transmitter) 2, a GPS antenna 3, a GPS signals receiver 4, a speaker 5, a microphone 6, a voice controller 7, a key operation portion 8, a display 9, a memory 10 and a control unit 11. The CDMA antenna 1 is used for communicating with the base stations BS.

The CDMA radio communicator 2 receives signals from the base stations BS and transmits signals to the base stations BS. The GPS antenna 3 and the GPS radio receiver 4 are used for receiving the GPS signals. An antenna can be alternatively shared by the GPS antenna 3 and the CDMA antenna. The speaker 5, the microphone 6 and the voice controller 7 act as voice interfaces between the mobile terminal and user thereof. The key operation portion 8 is operated by a user and transmits signals with respect to the key operation to the control unit 11. The display 9 shows information such as position information of the mobile terminal MS to user. A touch panel type display is alternatively used for the display 9 that also acts the key operation portion 8. The memory 10 has memorized predetermined programs and data and memorizes programs and data transmitted form the control unit 11. The control unit 11 has a plurality of processing portions (e.g., a reference portion and an identification code acquisition portion) and executes the programs and controls respective portions 2, 4 and 7-10.

Figure 3:
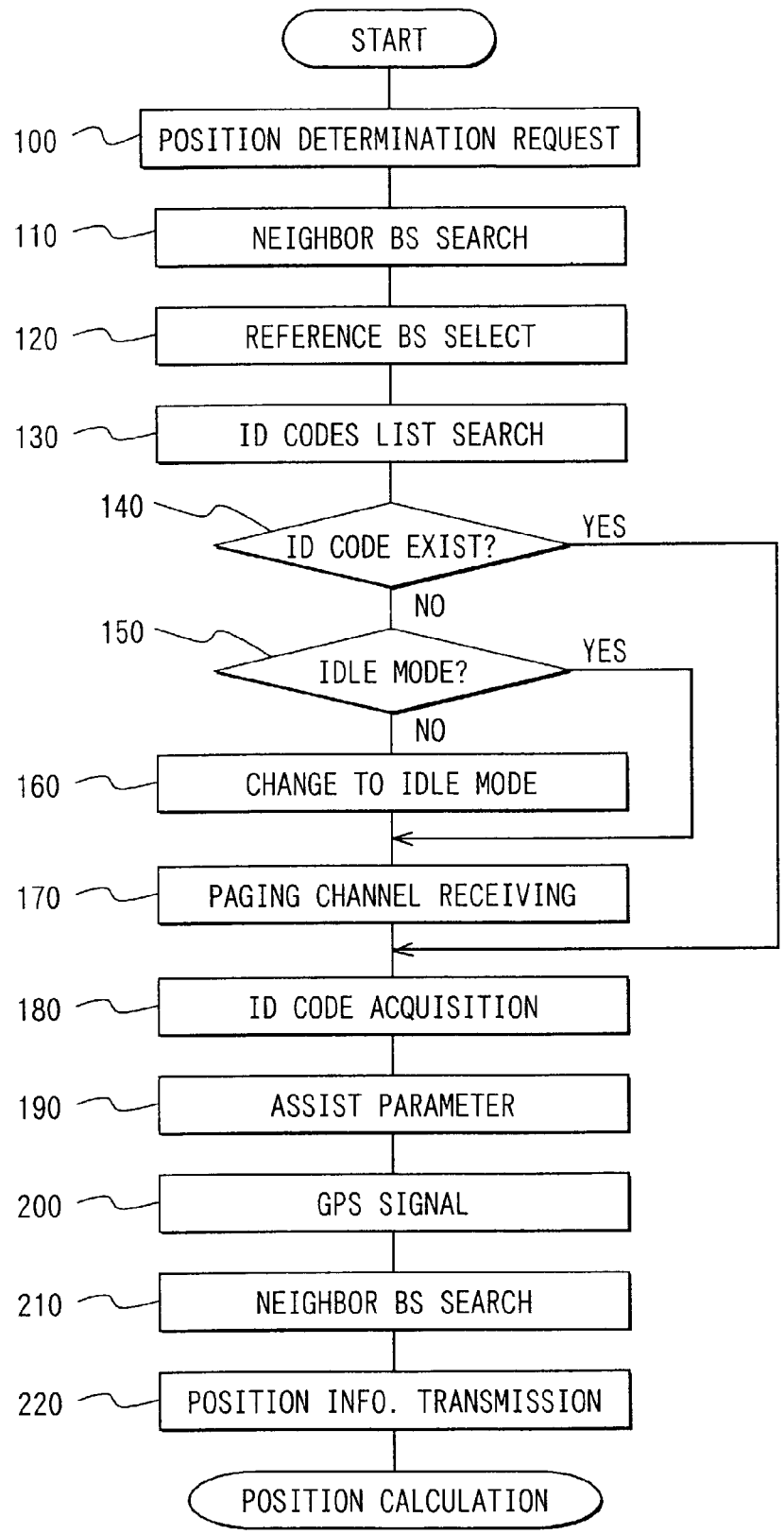
FIG. 3 is a flow chart showing a position information collection process according to the first embodiment.
Figure 4:
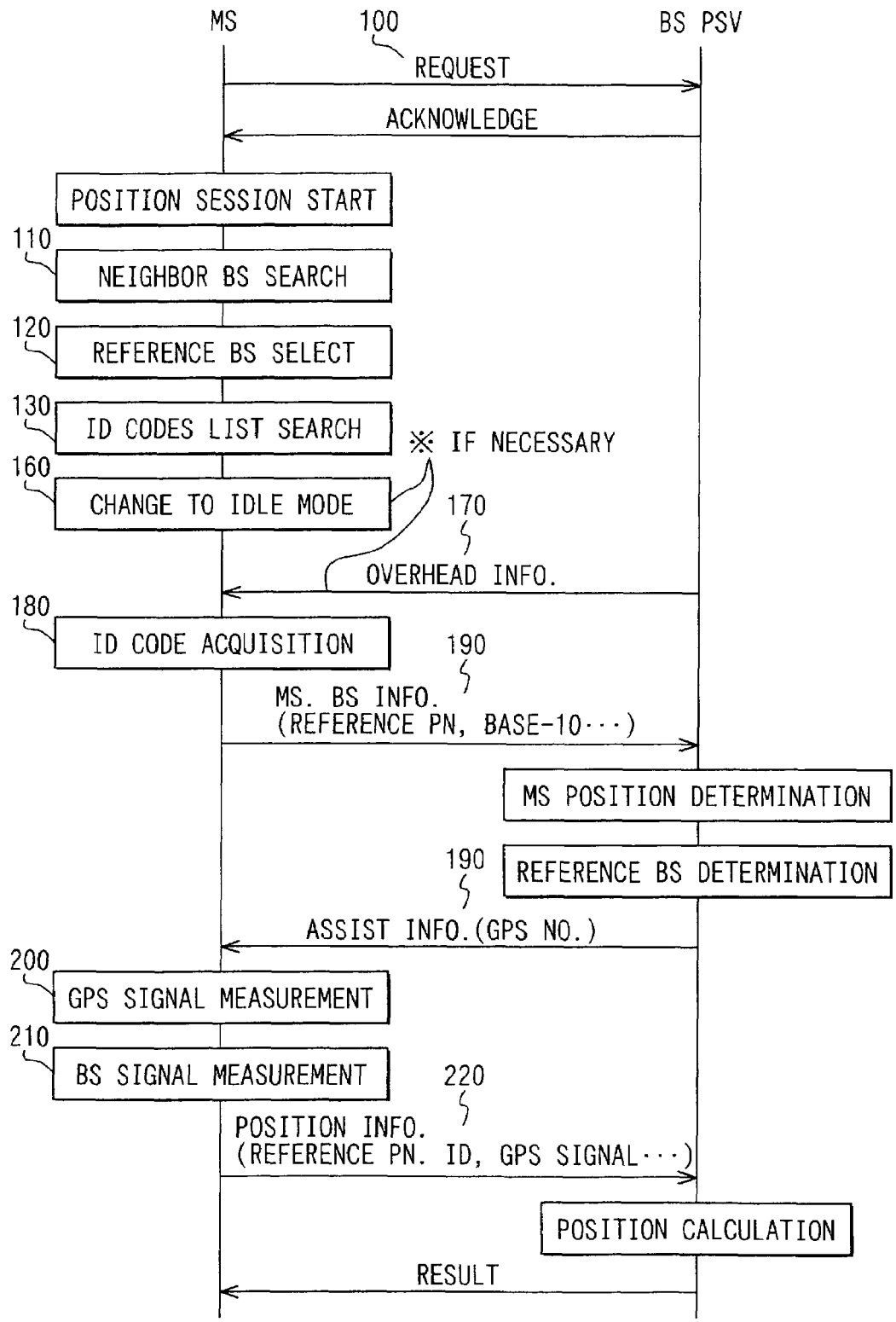
FIG. 4 is a schematic view showing a communications sequence according to the first embodiment.

FIG. 3 is a flow chart of the mobile terminal MS, and FIG. 4 shows a communications sequence among the mobile terminal MS, the base stations BS and the position server PSV. In FIG. 4, reference PN indicates a PN offset of a reference base station and BASE-ID indicates an identification code of respective base stations BS.

At 100, the mobile terminal MS requests initiation of position determination as a trigger of the position determination. The request signal of position determination is transmitted to the position server PSV via the CDMA network when a user operates a key to confirm the user's position. The request signal may be transmitted to the position server PSV from the CDMA network through another communications device when other persons request the user's position.

The position server PSV transmits a response signal in response to the request signal to the mobile terminal MS via the CDMA network. The mobile terminal MS then searches neighbor base stations BS based on a neighbor list (110).

The neighbor list is a search list including PN offsets that correspond to the neighbor base stations BS. The neighbor base stations BS included in the neighbor list are assigned PN offsets different from each other. The neighbor list is included in overhead information, which is transmitted from a communication target base station and received at the mobile terminal MS, and is received when the mobile terminal MS is, for example, in an idle mode waiting for a communication. The overhead information includes not only the neighbor list but also an identification code of a communication target base station, a network ID (identifier), and an available signal frequency for communicating with the communication target base station. The neighbor list is renewed every time the mobile terminal MS intermittently gains the overhead information from the communication target base station. Incidentally, in the idle mode, for example, the base station whose signal intensity received at the mobile terminal MS is the strongest of the neighbor base stations BS is selected as the communication target base station.

The mobile terminal MS searches the neighbor list and selects the reference base station based on the received signal from the searched neighbor base stations BS using the reference selection portion equipped in the control unit 11. Specifically, a base station having the shortest signal delay time is selected as the reference base station, and a PN offset thereof is memorized in the memory 10 as the PN offset of the reference base station. As a result, the base station that is estimated as being closest to the mobile terminal MS is defined as the reference base station. Also, the mobile terminal MS memorizes PN offsets and signal delay times of the communication target base station and the other base stations obtained during the idle mode in the memory 10.

At 130 and 140, the mobile terminal MS searches an identification codes list based on the PN offset to determine whether an identification code with respect to the PN offset of the selected reference base station exists.

Figures 5, 6:
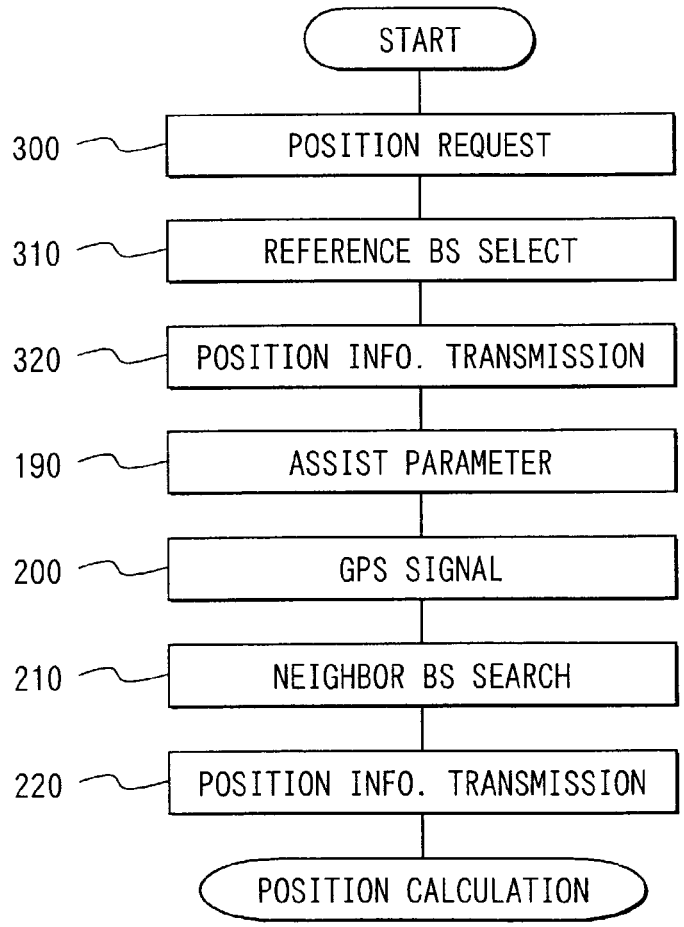
FIG. 5 is a schematic view showing an identification codes list according to the first embodiment.
FIG. 6 is a flow chart showing a position information collection process according to a second embodiment of the present invention.

The listing of identification codes list is described with reference to FIG. 5. The control unit 11 has an identification code acquisition portion that lists and updates the identification codes list during an idle mode. In the idle mode, the mobile terminal MS receives overhead information of the communication target base station using the paging channel and acquires a PN offset, an identification code and a communication frequency of the communication target base station from the overhead information. Then, as shown in FIG. 5, the identification codes list is listed and updated by storing plural sets of PN offset and identification code (and the available signal frequency) and is stored in the memory 10 of the mobile terminal MS. The update of the identification codes list is executed when the mobile terminal MS intermittently receives the overhead information during the idle mode. The identification codes list is completed and is used for position calculation of the mobile terminal MS no matter when the position information is requested. Incidentally, the identification codes list can alternatively be reset by turning the power of the mobile terminal MS on or off and listing it again during the next idle mode.

The processing advances to 180 in response to an affirmative determination (YES), while the processing advances to 150 in response to a negative determination (NO).

At 150, the mobile terminal MS determines whether the mobile terminal MS itself is in the idle mode. The processing advances to 170 in response to an affirmative determination (YES). On the other hand, the processing advances to 160 in response to a negative determination (NO) to disconnect communication of the mobile terminal MS and change it to an idle mode.

At 170, the mobile terminal MS receives a paging channel and acquires overhead information of the reference base station in the idle mode. At 180, the identification code of the reference base station that is located from the identification codes list in 140 or that is acquired from received paging channel in 170 is temporarily memorized in the memory 10. This processing corresponds to an identification code acquisition.

According to the present embodiment, the reference base station is determined by the identification code. The identification code of the base station E being inside of the serving region is different from that of the base station D being outside of the serving region even if respective PN offsets thereof are the same (PN128) in FIG. 9. Therefore, the mobile terminal MS does not select the base station D as the reference base station even if no base station is closer than the base station E.

The mobile terminal MS communicates with the communication target base station after the identification code of the reference base station is acquired. The mobile terminal MS then transmits the memorized information in the memory 10, e.g., the PN offset (reference PN) and the identification code of the reference base station, the identification code (BASE-ID) of the serving base station, the PN offsets and the signal delay times of the neighbor base stations BS to the position server PSV.

The position server PSV acquires the information and directly determines the reference base station based on the received identification code without investigating the positional relationship between the reference base station and the serving region. At 190, the position server PSV determines an approximate position of the mobile terminal MS and identifies GPS satellites (e.g., GPS satellite numbers) to be used by the mobile terminal MS based on the approximate position of the mobile terminal MS. The position server PSV then transmits assist information including the resultant GPS signals (e.g., GPS numbers) to the mobile terminal MS and the like. The mobile terminal MS receives the assist information and GPS signals corresponding to the GPS satellites identified by the position server PSV. At 200, the mobile terminal MS temporarily memorizes data from the GPS signals.

At 210, signal delay times of the neighbor base stations BS are updated. Then, at 220, the mobile terminal MS transmits the updated signal delay times with the PN offset and the identification code of the reference base station, the GPS signal, and the PN offset of the neighbor base stations BS to position server PSV as position information.

The position server PSV calculates the latitude and longitude of the mobile terminal MS, error thereof and the like based on the position information and then transmits the latitude, longitude, error thereof and the like to the mobile terminal MS. The mobile terminal MS displays the position thereof on the display 9.

According to the mobile terminal MS of the present embodiment, not only the PN offset defined in finite numbers but also the identification code assigned to respective base stations BS are transmitted to the position server PSV as position information for determining the reference base station that is used for position calculation. Therefore, the position server PSV can determine the reference base station based on the identification code quickly and precisely without investigating the positional relationship between the reference base station and the serving region. Accordingly, it is possible to distinguish the reference base station from the other neighbor base stations BS even if several base stations having the same PN offset, each of which is to be a candidate of the reference base station, exist around the mobile terminal MS. As a result, the position server PSV can calculate an accurate position of the mobile terminal MS without error.

Further, in the mobile terminal MS of the present embodiment, the identification codes list including a correspondence list between the PN offsets of the base stations BS and the identification codes thereof is listed, appropriately updated and memorized in the idle mode before the position calculation. Therefore, when position information is requested, an identification code of a requested base station can be acquired based on the identification codes list. In this case, it is unnecessary for the mobile terminal MS to return to the idle mode to prepare the identification code.

Second Embodiment

In the second embodiment, a reference base station is determined as the same base station as a serving base station. Specifically, when the mobile terminal MS determines the reference base station, the PN offset of the serving base station corresponding to a communication target base station is transmitted to a position server PSV as a PN offset of the reference base station instead of a PN offset of the base station having the shortest signal delay time in a neighbor list.

Figure 7:
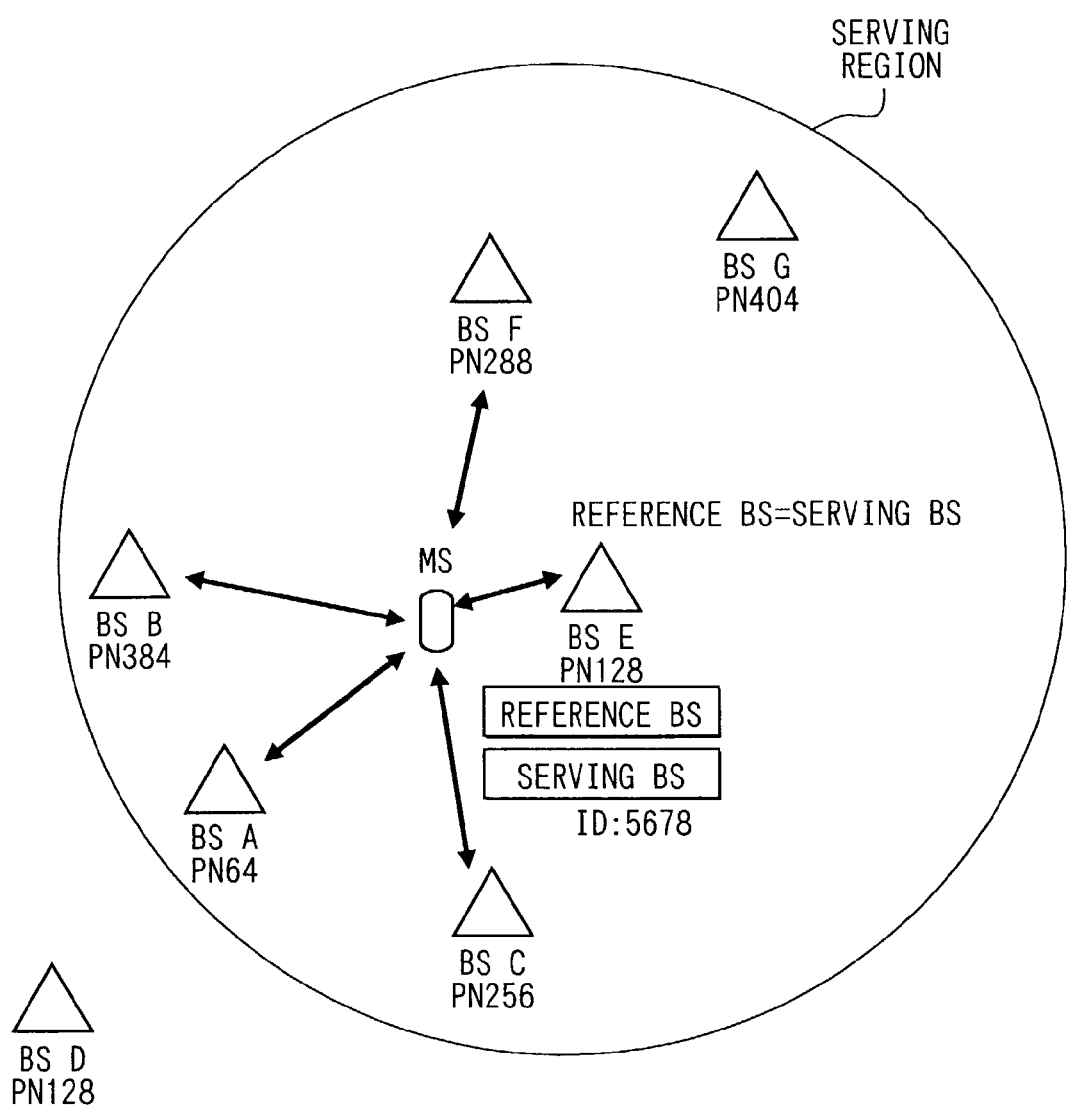
FIG. 7 is a schematic view showing a case when a reference base station corresponds to a serving base station according to the second embodiment.
Figure 8:
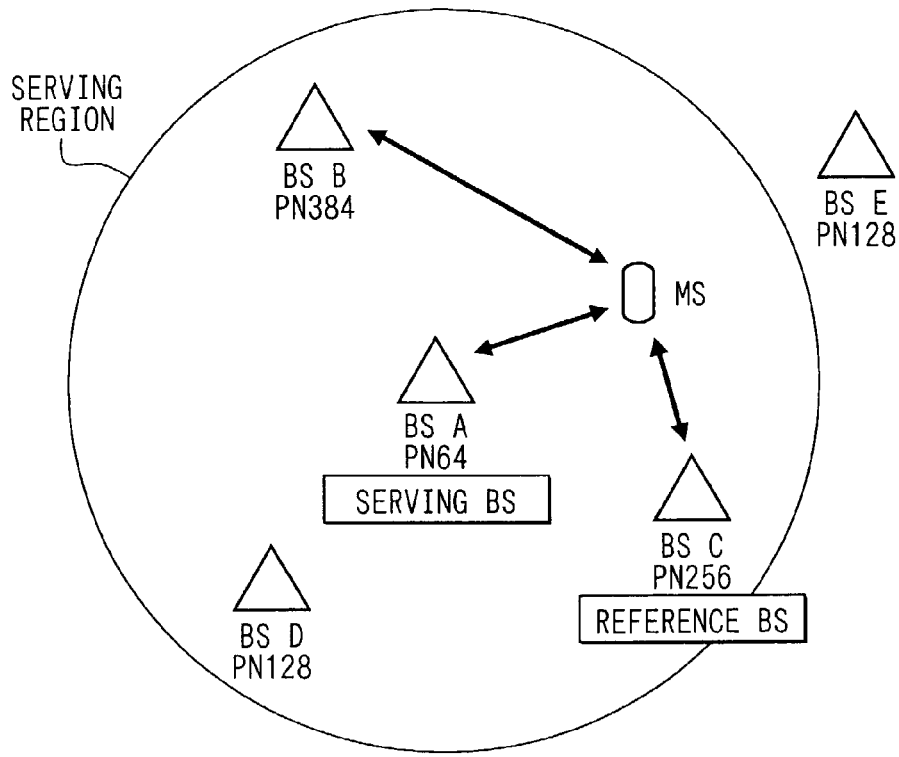
FIG. 8 is a schematic view showing a position relationship between base stations and the mobile terminal when accuracy position calculation can be done.

This is described with reference to FIGS. 6 and 7. In FIG. 6, first, position determination request is determined at 300. At 310, the mobile terminal MS then selects the PN offset (PN 128) of the serving base station E corresponding to the communication target base station as the PN offset of the reference base station. At 320, the selected PN offset of the reference base station is transmitted to the position server PSV.

Successively, as mentioned in the first embodiment, processing at 190 through 210 is executed. Further, at 220, the PN offset of the reference base station determined as the same PN offset as that of the serving base station is transmitted to the position server as position information similarly as in 320. Accordingly, because the mobile terminal MS already knows an identification code (ID: 5678) of the communication target base station, i.e., the serving base station, the identification code can be acquired as the reference base station without returning an idle mode.

In this case, the reference base station is determined based on the identification code as the first embodiment. Therefore, even if PN offsets of the base stations BS in a serving region are overlapped, it is possible to distinguish the reference base station from the other neighbor base stations BS. As a result, the position server PSV can calculate an accurate position of the mobile terminal MS without error.

Also, in the present embodiment, the reference base station is determined to be the same base station as a serving base station. Therefore, additional processing for acquiring the identification code of the reference base station is not needed.

Third Embodiment

In the third embodiment, as with the second embodiment, a reference base station is also determined to be the same base station as a serving base station. However, the present embodiment differs from the second embodiment as follows.

In the present embodiment, when a reference base station has already been determined by an identification code, the identification code of the reference base station is included in position information and transmitted to the position server as an identification code of the serving base station. That is, in this case, a communication target base station may not be selected as the serving base station.

Figure 9:
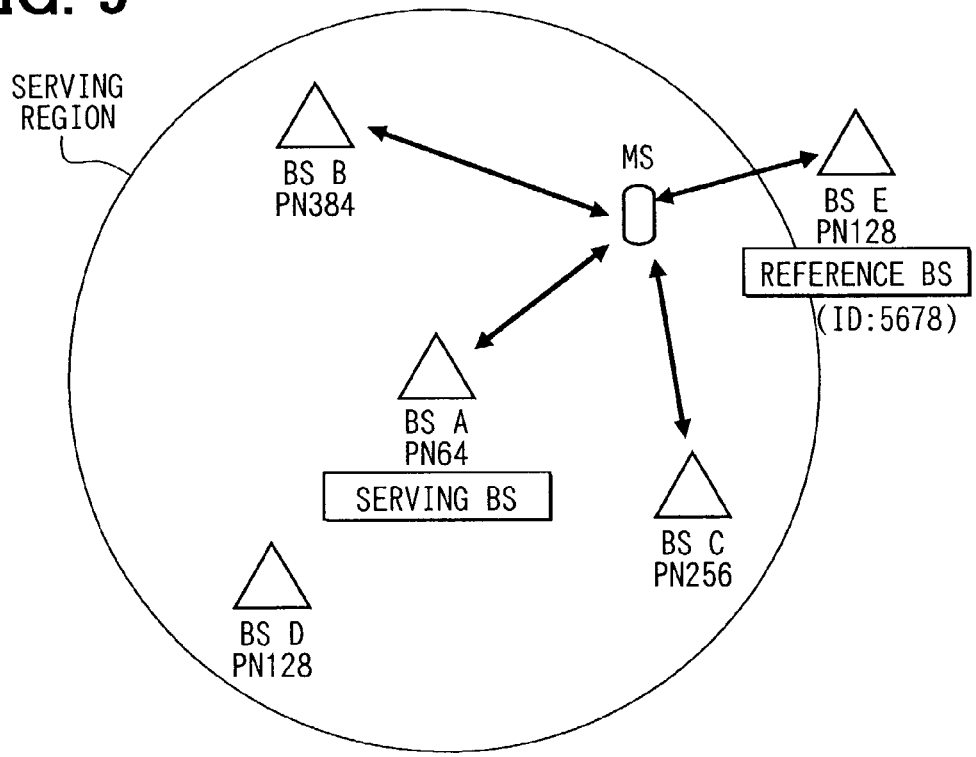
FIG. 9 is a schematic view showing a position relationship between base stations and the mobile terminal when accuracy position calculation cannot be performed because the mobile terminal moves from the position shown in FIG. 8.

In an example in FIG. 9, the identification code (ID: 5678) of the reference base station E (PN 128), which is known to a mobile terminal MS, is transmitted to the position server at 190 and 220 in FIG. 3. Other processing is executed the same as in FIG. 3.

Accordingly, the position server can determine the reference base station because the reference base station corresponds to the serving base station when the reference station is determined in a serving region defined from the serving base station.

Also, in the present embodiment, the reference base station is determined to be the same base station as a serving base station. Therefore, additional processing for acquiring the identification code of the reference base station is not needed.

The present embodiment can alternatively be adopted when the identification code of the reference base station is listed in an identification codes list.

While the above description is of the preferred embodiments of the present invention, it should be appreciated that the invention may be modified, altered, or varied without deviating from the scope and fair meaning of the following claims.

What is claimed is:

1. A mobile communications terminal for communicating with base stations forming a CDMA communications network and acquiring base station information from the base stations so that a network position thereof is determined by a network server based on the base station information, comprising:

a reference determination portion for determining a reference base station as a time reference for network position determination purposes from a neighbor base station with respect to the mobile communications terminal based on PN offsets assigned to respective base stations;

an identification code acquisition portion for acquiring an identification code of the determined reference base station; and a transmitter for transmitting the identification code of the determined reference base station to a position server via the network, wherein the identification code acquisition portion receives overhead information of the determined reference base station to acquire the identification code of the determined reference base station during an idle mode, and disconnects communication of the mobile communications terminal and places the mobile communications terminal in an idle mode if the mobile communications terminal is connection mode, and then receives the overhead information during the idle mode.

* * * * *